B. F. YOUNG.
CULTIVATOR.

No. 109,363.  Patented Nov. 15, 1870.

United States Patent Office.

BENJAMIN F. YOUNG, OF TOULON, ILLINOIS.

Letters Patent No. 109,363, dated November 15, 1870.

IMPROVEMENT IN CULTIVATORS.

The Schedule referred to in these Letters Patent and making part of the same.

*To all whom it may concern:*

Be it known that I, BENJAMIN F. YOUNG, of Toulon, in the county of Stark, and in the State of Illinois, have invented a new and improved Cultivator; and do hereby declare that the following is a full, clear, and exact description thereof, reference being had to the annexed drawing making a part of this specification, in which like letters of reference refer to like parts, and in which—

Figure 1:
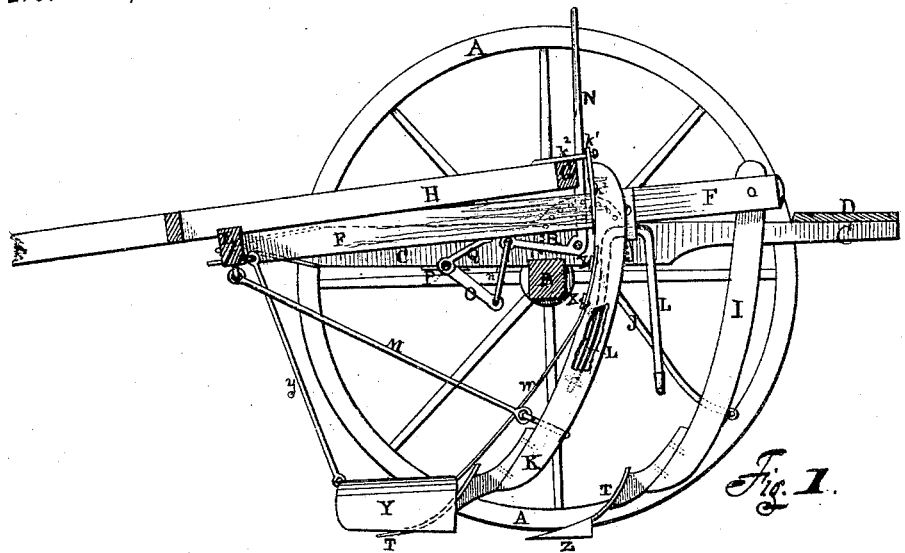
Figure 1 represents a vertical longitudinal section, as indicated by the line $x\ x$ of fig. 2.

My invention relates to a combination and arrangement of devices, as will hereinafter be explained.

Like letters in the figures of the drawing indicate like parts.

A are the wheels.

B, the axle.

To the part near the end of the latter are fastened the middle parts of the side bar C, which, with the seat D attached to their rear ends, form the outside frame of the cultivator.

To the forward ends of the side bars C are hinged the ends of the front cross-bar E of the inner frame, the side bars F of which extend back and are connected in the rear of their middle parts by the rear cross-bars G.

H H are the rear divisions of the split draft-tongue, thus split to enable the operator to have a full view of the row of corn. These are securely fastened to the cross-bar E and G of the inner frame.

I are the rear plow-standards, the upper ends of which are pivoted to the rear ends of the side bars F, and to the lower ends of which the plows are attached.

The draft-strain upon the standards I is sustained by the brace-rods J, the lower ends of which are secured to the standards, and the upper ends made adjustable to the side bars F by bolts and holes in the braces J, so as to regulate the depth of the plow in the soil.

K are the forward plow-standards, which are hung by plates, $k$ to the bolts or pins $k^2$, attached to the cross-bar G, at or near the ends of the tongue.

The standards K are made to move together and parallel with each other by means of the connecting-bars X X, producing thus a parallel motion.

L are two levers, the middle parts of which are pivoted to the side bars F, near and under the cross-bar G, the two ends of which are inclined downward and inward.

Upon the rear ends of these levers are stirrups or a bent termination of the lever to receive the feet of the driver and operator for the purpose of regulating and oscillating the plows in cultivating crooked rows of corn and irregular hills.

Figure 2:
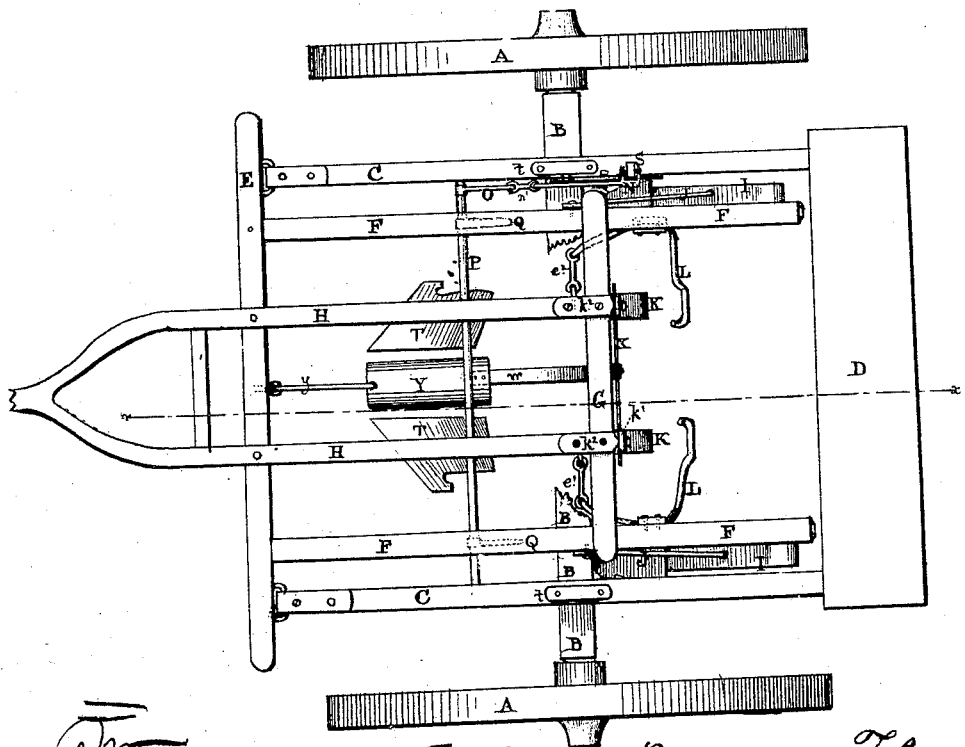
Figure 2, is a plan or top view.

The forward ends of the levers are connected with the plow-standards K by the links $e^1\ e^2$, seen in fig. 2.

The draft strain on the latter standard is sustained by the draft-rods M, the forward ends of which are pivoted to the front cross-bar E, the rear ends being connected with the lower parts of the standards K by eye-bolts and nuts to regulate the length of the rods.

N is a bent lever, pivoted at its angle to the side bar C, the upper end of which extends up so as to be within reach of the operator's hands.

The lower forward end of this lever is connected by a link, $n'$ with the outer ends of the arm O, the other end of which is rigidly attached to the rock-shaft P, the ends of which work in bearings in the side bars C, and from which project the arms Q, the free ends of which rest against the under side of the side bars F, so that by operating the lever N the pivoted frame E F G, with all the plows, may be raised from the soil to avoid obstructions or pass from place to place.

R is a semicircular plate, attached to the side bar and provided with holes receive the catch-pin of the catch-lever S, which is pivoted to the lever N and held in any position desired against the catch-plate R by a spring between the upper parts of the levers N and S; by this device the plows may be retained at any desired elevation.

T are the plows, which are secured to an adjustable shoe on the lower end of the standards to throw soil to or from the plants.

Y is a shield or fender, which is of a semicircular shape, and placed between the two inner plows to protect the tender plants from injury by large clods, the shield spanning the corn-row like a roof; the brace $y$ attached to its forward end is hitched to the cross-bar E; the rear end of the shield is supported by the brace W, carried upward and backward and fastened between the plow-standards to the parallel motion-bars X X, its proper distance between the plows near it being thus regulated.

Z is a land-side, made short and forming a part of the plow.

The operation of this machine is as follows:

On going to the field the plows are kept from the ground by means of the lever on one side of the frame, which, on being depressed, raises the connected arm of the rocking rest which raises the upper arms of the latter against the under side of the outer plow-beams I I, thus raising the plows from the ground.

The corn is dodged by means of the pressure of the feet on either or both of the stirrup-braces giving the attached plows a motion either to the right or left. The forking or division of the rear end of the tongue gives a full view of the row of corn-plants, so that the operator can readily operate and manage the shield Y advantageously.

The short land-sides are designed to keep the plows from a lateral motion.

Having thus fully described my invention,

What I claim therein as new, and desire to secure by Letters Patent, is—

The arrangement of plate R, lever N, rocking shaft P, arms Q Q, link n', shield Y, braces y and W, parallel motion-bars X X, stirrups L L, plow-standards K K and I I, with braces J J, all as shown and set forth.

In testimony that I claim the foregoing cultivator, I have hereunto set my hand this 1st day of April, 1870.

BENJAMIN F. YOUNG.

Witnesses:
E. THURLOW,
H. W. WELLS.